US005989667A

United States Patent [19]

Tayebi

[11] Patent Number: 5,989,667

[45] Date of Patent: Nov. 23, 1999

[54] OPAQUE STICKER FOR TEMPORARY POSTING APPLICATIONS AND SUBSEQUENT SAVING WITHOUT EXHIBITING INCONVENIENT STICKING TO OTHER SURFACES

[76] Inventor: Amad Tayebi, 5 Sequoia Rd., Westford, Mass. 01886

[21] Appl. No.: 08/828,878

[22] Filed: Mar. 31, 1997

Related U.S. Application Data

[60] Provisional application No. 60/044,694, Feb. 10, 1997.

[51] Int. Cl.[6] .................................. B32B 7/06; B41L 1/24

[52] U.S. Cl. .......................... 428/40.1; 283/81; 428/42.1; 428/42.2; 428/42.3; 428/43; 428/131; 428/136; 428/194

[58] Field of Search ................................. 428/40.1, 42.1, 428/42.2, 42.3, 194, 43, 131, 136; 283/81

[56] References Cited

U.S. PATENT DOCUMENTS

| | | | |
|---|---|---|---|
| 3,098,320 | 7/1963 | Estkowski | 428/43 |
| 4,884,826 | 12/1989 | Slagsvol | 428/194 |
| 5,318,825 | 6/1994 | Naber | 428/192 |

OTHER PUBLICATIONS

Merriam–Webster's Collegiate Dictionary, Tenth Edition, 1996.

Roget's II, The New Thesaurus,Expanded Edition, The American Heritage Dictionary, 1988.

*Primary Examiner*—Nasser Ahmad

[57] ABSTRACT

A novel temporary posting sticker comprises a first area coated with a non-destructive adhesive coating and a second area substantially free from such non-destructive adhesive coating and a weakened tear line that substantially separates the first area from the second area. By tearing the sticker along the weakened tear line, the second area of the sticker, which may contain written or printed information, may be saved as an ordinary adhesive-free memo note thereby overcoming the nuisance inconvenient sticking to other surfaces exhibited by prior art temporary posting stickers. Alternatively, the novel sticker comprises a weakened fold line (score line) such that when the sticker is folded along the score line the adhesive coating on the first area is substantially covered and adheres to the back side of the posting sticker. Thus, the second area of the sticker may be saved without exhibiting any inconvenient sticking to other surfaces.

1 Claim, 3 Drawing Sheets

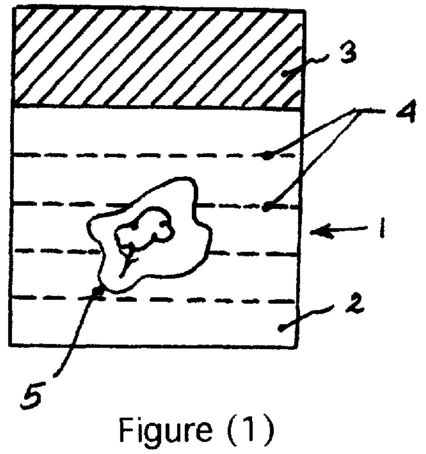
Figure (1)
(Prior Art)
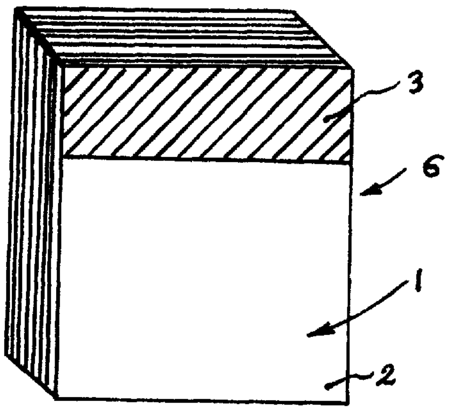
Figure (2)
(Prior Art)
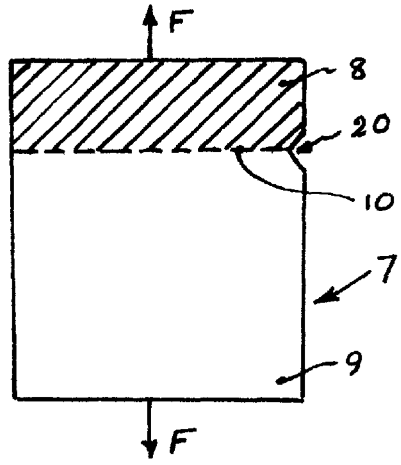
Figure (3)
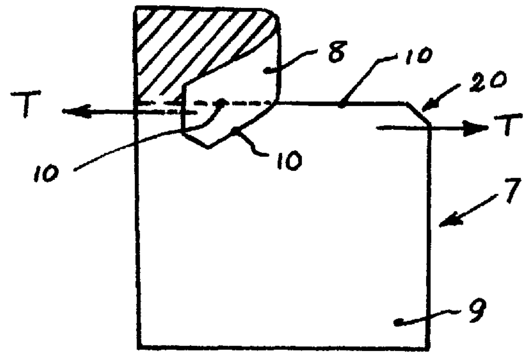
Figure (3-A)
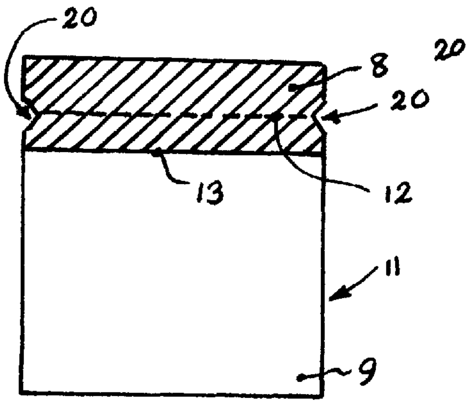
Figure (4)
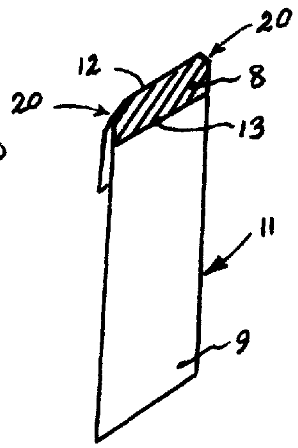
Figure (4-A)
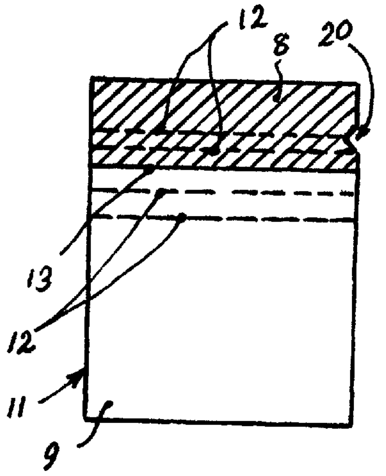
Figure (4-B)

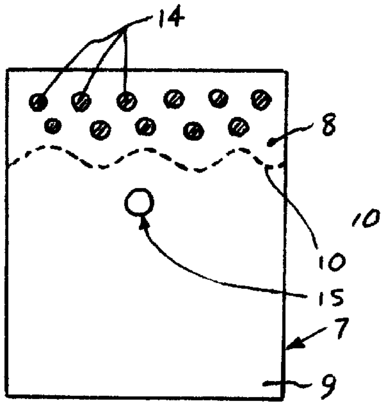
Figure (5)
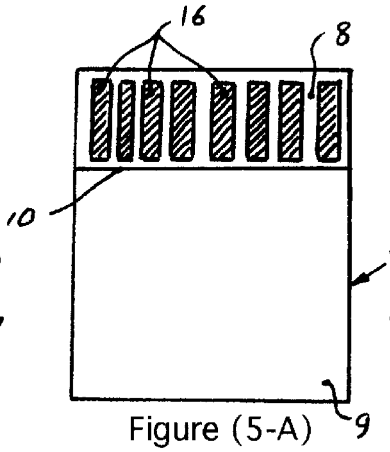
Figure (5-A)
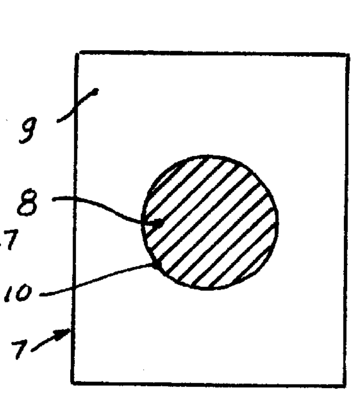
Figure (5-B)
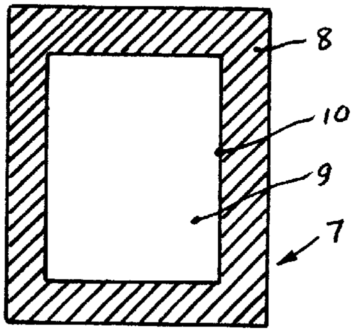
Figure (5-C)
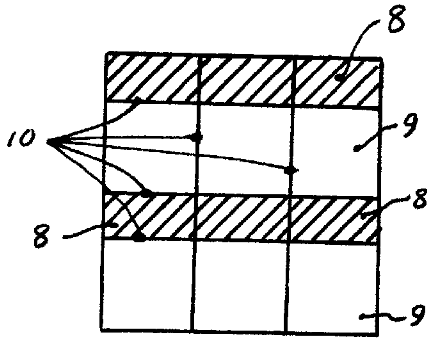
Figure (5-D)
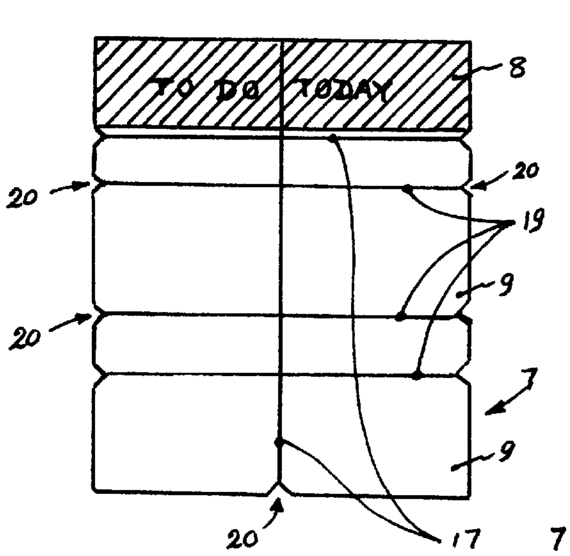
Figure (6)
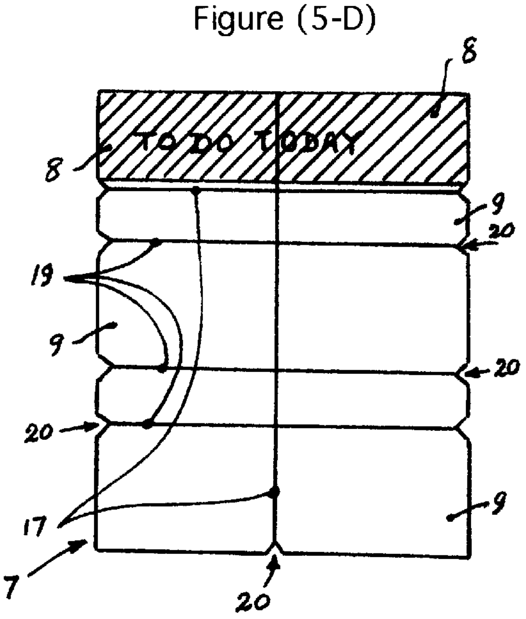
Figure (6-A)

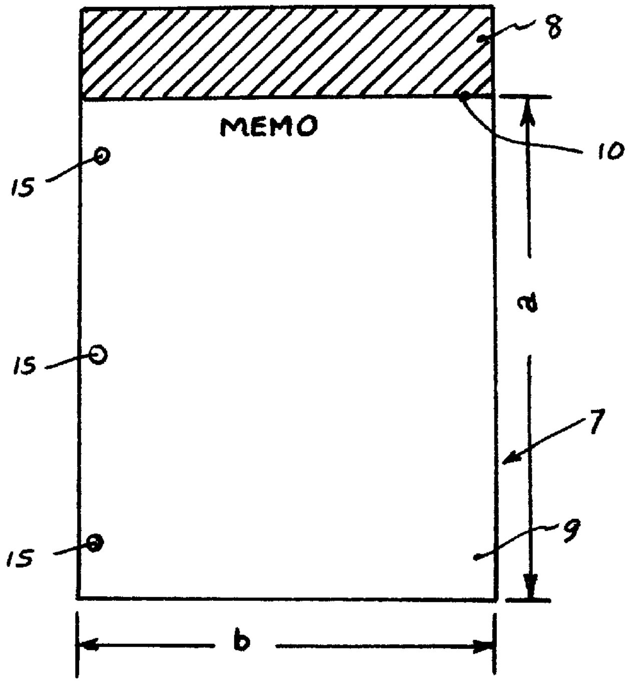
Figure (7)
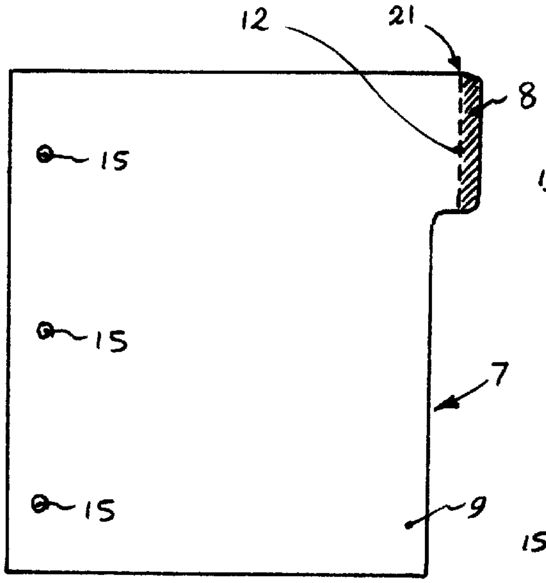
Figure (8)
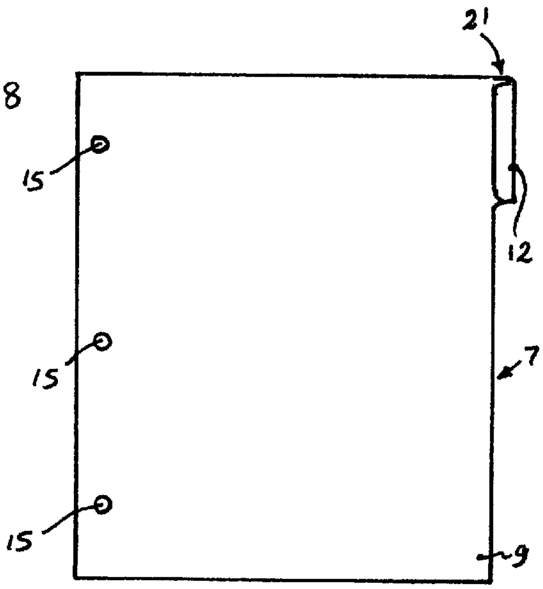
Figure (8-A)

OPAQUE STICKER FOR TEMPORARY POSTING APPLICATIONS AND SUBSEQUENT SAVING WITHOUT EXHIBITING INCONVENIENT STICKING TO OTHER SURFACES

This application is a continuation of Provisional Patent Application, Ser. No. 60/044,694, filed on Feb. 10, 1997.

FIELD OF THE INVENTION

The present invention is in the field of adhesive-coated stickers. In particular, it relates to stickers coated with non-destructive adhesive coating wherein the sticker may be peeled off without being destroyed and without destroying the surface on which it is posted.

SUMMARY OF THE INVENTION

In accordance with the present invention, a novel temporary posting sticker comprises a first area coated with a non-destructive adhesive coating and a second area substantially free from such non-destructive adhesive coating and a weakened tear line that substantially separates the first area from the second area. Prior to tearing the sticker along the weakened tear line, the sticker is similar in form and function to the posting stickers of the prior art. However, after tearing the sticker along the weakened tear line, the second area of the sticker, which may contain written or printed information, may be saved as an ordinary adhesive-free memo note thereby overcoming the nuisance inconvenient sticking to other surfaces exhibited by prior art temporary posting stickers.

Alternatively, the novel sticker of the present invention comprises a weakened fold line (score line) such that when the sticker is folded along the score line the adhesive coating on the first area is substantially covered and adheres to the back side of the posting sticker. Thus, the second area of the sticker may be saved without exhibiting any inconvenient sticking to other surfaces.

BACKGROUND OF THE INVENTION

Adhesive-coated stickers are flexible material sheets which are coated, on one side, with an adhesive layer which is subsequently covered by a non-stick material sheet. In order to apply the sticker to a surface, the non-stick material sheet is peeled off the coated surface and the coated surface is then pressed against the surface over which the sticker is to be posted. The flexible material of the sticker may be made of paper, fibrous sheet, plastic film (which may be transparent, translucent or opaque), metal foil or other materials known in the art. The non-stick material sheet may be made of silicone-coated, wax-coated, Teflon-coated or some other non-stick material-coated paper, fibrous sheet, plastic film, metal foil or other non-stick materials commonly known in the art as release-coated materials or paper sheets.

The adhesive coating applied on the sticker surface may be chosen from a variety of adhesives, known in the art. When the adhesive is of high strength or a permanent nature, peeling the sticker off the surface on which it is applied usually results in some damage to the sticker, the surface on which it is applied or, in some cases, both. On the other hand, when the adhesive coating is of a weak, non-destructive or temporary adhesion nature, as the sticker is peeled off, the adhesive remains on the sticker and the application surface suffers no damage. When the surface of such sticker is partially coated, usually in some area adjacent to its edge, and a plurality of stickers are stacked in a writing or memo pad form, as it is well known in the art, the stickers are used for temporarily referencing a sheet or a page in a book or for temporarily posting a note. In accordance with the present invention, such partially-coated sticker is referred to as a postable sticker.

An inconvenience encountered in use of postable stickers of the prior art is that when not posted onto a surface, the exposed adhesive-coated area sticks to other surfaces it is brought in contact with. This poses an inconvenience when a user elects to save the sticker in order to save the information written or printed on it. A user may take one of three approaches to overcome such inconvenience when he or she desires to save the information on the sticker, namely; (1) fold the sticker in order to cover the adhesive layer, (2) cut or tear the sticker along a line that separates the coated area from the uncoated area. This is usually done by using scissors or by folding and pressing the sticker along the folding line then tearing it along such line, or (3) cover the adhesive-coated area with a strip of paper.

The present invention makes it possible to overcome such inconvenience by introducing a weakened tear line in the sticker along a path that substantially separates the coated area from the uncoated area. Therefore, when a user elects to save the information on the postable sticker, without encountering the inconvenience of sticker adhesion to other surfaces, he or she may tear the sticker along the weakened tear line and retain the adhesive coating-free portion of the sticker.

Alternatively, the present invention solves the same problem, of postable sticker inconvenient adhesion to other surfaces, by introducing a weakened fold line (score line) in the sticker such that when the sticker is folded along the weakened fold line (score line) and pressed, the adhesive coating on the first area is substantially covered and adheres to the back side of the postable sticker. Thus, the second area of the sticker may be saved without exhibiting any inconvenient sticking to other surfaces.

In addition to overcoming the problems of inconvenient adhesion of stickers of the prior art, the present invention makes it possible to expand the utility of the stickers of the prior art by introducing additional weakened tear lines and/or score lines that divide the postable sticker into a plurality of sections for selective partial removal of sections of the sticker along predetermined weakened tear lines or score lines.

BRIEF DESCRIPTION OF THE DRAWING

FIG. 1 shows a front view of a postable sticker of the prior art.

FIG. 2 shows an isometric view of a postable sticker pad of the prior art.

FIGS. (3) and (3-A) show a weakened tear line type postable sticker of the present invention.

FIGS. (4), (4-A) and (4-B) show a score line type postable sticker of the present invention.

FIGS. (5), (5-A), (5-B), (5-C) and (5-D) show a variety of postable stickers of the present invention with partially adhesive-coated first area, pre-punched holes and decoratively shaped weakened tear lines and score lines.

FIGS. (6) and (6-A) show postable stickers of the present invention with a plurality of weakened tear lines.

FIG. (7) shows a postable sticker of the present invention with pre-punched holes.

FIGS. (8) and (8-A) show postable stickers of the present invention in the form of a separation tab.

DETAILED DESCRIPTION OF THE INVENTION

FIG. (1) shows a postable sticker 1 of the prior art which comprises a first area 3 coated with a temporary adhesion coating and a second area free from any adhesive coating. In some embodiments of prior art postable sticker 1, second area 2 is pre-printed (ruled) with lines 4, decorative designs 5 or other pre-printed information or decorative effects. As shown in FIG. (2), a plurality of postable sticker 1 of the prior art is assembled in a multi-layer stack or pad form 6.

FIGS. (3) and (3-A) show an embodiment of postable sticker 7 in accordance with the present invention. As shown therein, postable sticker 7 comprises a first area 8, a second area 9 and a weakened tear line 10. Tear line 10 substantially separates first area 8 from second area 9. Similar to prior art, first area 8 is coated with a temporary adhesion coating which permits removal of postable sticker 7 from a stack of postable stickers or from a surface on which postable sticker 7 is posted without damage to sticker 7 or to the surface on which it is posted. Such temporary adhesion coating is known in the art, for example, pressure sensitive adhesion coating. Second area 9 is substantially free from such temporary adhesive coating. Weakened tear line 10 provides a low tear and/or tensile strength line that directs an initial tear, started, as shown in FIG. (3-A) at the edge of postable sticker 7, to propagate along its path by offering lower resistance to tear against tear force T. In likewise manner, weakened tear line 10 localizes the tensile failure line to occur along its path when postable sticker 7 is subjected to tensile force F.

Alternatively, in accordance with another embodiment of the present invention, FIG. (4) shows postable sticker 11 comprising first area 8, second area 9, a line 13 defined by the boundary of first area 8 and a weakened fold line (score line) 12. Weakened fold line (score line) 12 directs a fold of postable sticker 11, generated around an axis substantially parallel to line 13, to occur on line 12, as shown in FIG. (4-A). In so doing, the postable sticker of the present invention may be folded and pressed together along a consistently predictable fold line and thereby covering the adhesive coating of first area 8 and overcoming the inconvenient adhesion problem of the prior art. A plurality of score line 12 may be located within first area 8 or within second area 9, as shown in FIG. (4-B).

FIGS. (5) and (5-A) show another embodiment of the present invention wherein first area 8 is partially coated with a discontinuous temporary adhesive coating in areas 14 and 16 respectively. As such, in accordance with the present invention, first area 8 may comprise temporary adhesion coated areas and areas substantially free from any adhesive coating while still being able to exhibit a temporary adhesion nature when pressed onto a surface.

In accordance with the present invention, weakened tear line 10 and score line 12 may be of a continuous or discontinuous nature, only weakened, only scored, partially scored, partially weakened or having a combination of coinciding or separate score lines, weakened tear lines, pre-slit (cut) lines and perforated or micro-perforated lines. Line 10 may also be of a straight line form or a decorative or other functional form, for example, as shown in FIGS. (3), (5), (5-B) and (5-C). Also, first area 8 may be located adjacent to, outside of, surrounding or within second area 9 as shown in FIGS. (3), (5-C) and (5-B). Also, first area 8 may be of a rectangular shape, for example as shown in FIG. (3) or of a circular or any other decorative of functional shape, for example, as shown in FIGS. (5-B) and (5-C). Additionally, a plurality of first area 8 and second area 9, of same or different sizes and/or shapes, may be present in one postable sticker of the present invention, for example as shown in FIG. (5-D).

In accordance with the present invention, postable sticker 7 may also comprise at least one hole or cut out 15, as shown in FIGS. (5), (7) and (8). Hole or cut out 15 may be of any decorative or functional shape. Also, postable sticker 7 may include at least one notched section 20 for ease of initiating tear or fold along lines 10 or 12, as shown in FIG. (3), (3-A), (4) and (4-A).

The present invention also expands the utility of prior art postable stickers. As shown in FIGS. (5-D) and (6), postable sticker 7 comprises additional weakened tear lines such as 10, 17 and 19. In so being, a user may be able to selectively remove (tear out) and save or discard certain segment(s) of second area 9, as shown in FIG. (6-A), while maintaining the integrity of border zone joining first area 8 and second area 9. In so doing, the end user can have more use from a single postable sticker of the present invention than is presently possible from prior art stickers. Additionally, by incorporating holes in postable sticker 7, as shown in FIG. (7), the adhesive-free area of postable sticker may also be saved in a 3-ring binder without experiencing the inconvenient adhesion of prior art stickers. Dimensions a and b of such adhesive-free area may be equal to those of standard, popular or special size paper sheets.

As shown in FIGS. (8) and (8-A), other possible uses of the postable sticker of the present invention include creating tab separators, for example for 3-ring binders or other applications, by providing a score line 12 which separates first area 8 from second area 9. By folding tab 21 along line 12 one obtains a tab separator, index card or the like which exhibits no inconvenient adhesion to other surfaces. In an embodiment of such separation tab, postable sticker 7 is preferably made of transparent film or alternatively, first area 8 may be made of transparent material.

While what have been described in this section are some embodiments of the present invention, it is possible to use other sheet materials of the prior art or any other sheet materials, conceive or design many additional decorative or functional applications, shapes or stacks of the postable sticker of the present invention without departing from the spirit and scope of the invention.

What is claimed is:

1. A temporary posting adhesive-coated sticker capable of being temporarily attached to an application surface and subsequently saved without exhibiting inconvenient sticking to other surfaces, comprising:

a sheet of opaque flexible material having at least one first area and at least one second area; said first area being at least partially coated with an adhesive coating; said second area being substantially free from said adhesive coating; said adhesive coating being of a temporary adhesion nature such that when said sticker is attached to and subsequently peeled off said application surface, said adhesive coating remains on said first area of said sticker and said application surface suffers no damage; and, at least one weakened tear line, selected from the group consisting of pre-slit cutlines, preforated lines and microperforated lines, wherein said weakened tear line being of such a shape and location that it substantially separates said at least one first area from said at least one second area and wherein said weakened tear line providing a low tear strength that directs an initial tear, started at the edge of said slicker, to propagate along its path by offering lower resistance to tear against an applied tear force.

* * * * *